(12) United States Patent
Bates et al.

(10) Patent No.: US 9,594,666 B2
(45) Date of Patent: *Mar. 14, 2017

(54) ENHANCING WEAK CONSISTENCY

(71) Applicant: International Business Machines Corporation, Armonk, NY (US)

(72) Inventors: Cary L. Bates, Rochester, MN (US); Lee Helgeson, Rocherster, MN (US); Justin K. King, Rochester, MN (US); Michelle A. Schlicht, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 45 days.

This patent is subject to a terminal disclaimer.

(21) Appl. No.: 14/510,694

(22) Filed: Oct. 9, 2014

(65) Prior Publication Data

US 2016/0103751 A1    Apr. 14, 2016

(51) Int. Cl.
*G06F 11/36* (2006.01)

(52) U.S. Cl.
CPC ........ *G06F 11/362* (2013.01); *G06F 11/3632* (2013.01)

(58) Field of Classification Search
CPC ........................................ G06F 11/362–11/366
See application file for complete search history.

(56) References Cited

U.S. PATENT DOCUMENTS

| 5,784,552 | A  | * | 7/1998 | Bishop | G06F 11/3664 |
| | | | | | 714/38.12 |
| 6,378,124 | B1 | | 4/2002 | Bates et al. | |
| 6,941,492 | B1 | * | 9/2005 | Ezra | G06F 11/362 |
| | | | | | 714/27 |
| 7,302,527 | B2 | * | 11/2007 | Barrick | G06F 9/3851 |
| | | | | | 711/125 |
| 7,558,804 | B1 | * | 7/2009 | Polydov | G06F 9/445 |

(Continued)

OTHER PUBLICATIONS

Adve, S., et al., Weak Ordering—A New Definition, ISCA '98 25 years of the international symposia on Computer architecture (selected papers), 1998, pp. 363-375, [retrieved on Sep. 6, 2016], Retrieved from the Internet: <URL:http://dl.acm.org/>.*

(Continued)

*Primary Examiner* — Geoffrey St Leger
(74) *Attorney, Agent, or Firm* — Patterson + Sheridan, LLP

(57) ABSTRACT

Systems, methods, and computer program products to discover weak consistency errors in an application, by executing, by a debugger, a first thread of the application, by, determining that a first instruction in the first thread specifies to store a first value at a first memory address, setting a current value stored in the first memory address as an old value for the first memory address in a container for the first thread, executing the first instruction to store the first value at the first memory address, and setting the first value as a new value for the first memory address in the container for the first thread. The debugger then executes a second thread of the application, by restoring old values in the containers for all other threads and restoring a new value for each memory address specified in a container for the second thread to its respective memory address.

13 Claims, 4 Drawing Sheets

(56) References Cited

U.S. PATENT DOCUMENTS

| | | | | |
|---|---|---|---|---|
| 7,664,799 | B2* | 2/2010 | Mukherjee | G06F 9/5005 707/695 |
| 8,117,600 | B1* | 2/2012 | Roeck | G06F 11/3632 714/38.1 |
| 8,782,611 | B1* | 7/2014 | Kretzler | G06F 11/3632 717/129 |
| 2002/0162051 | A1* | 10/2002 | Bolding | G06F 11/3632 714/34 |
| 2005/0216895 | A1* | 9/2005 | Tran | G06F 11/362 717/127 |
| 2006/0107021 | A1* | 5/2006 | Barrick | G06F 9/3851 711/204 |
| 2009/0037498 | A1* | 2/2009 | Mukherjee | G06F 9/5005 |
| 2010/0251026 | A1* | 9/2010 | Panchamukhi | G06F 11/362 714/38.13 |
| 2011/0113285 | A1 | 5/2011 | Dolby et al. | |
| 2012/0266138 | A1* | 10/2012 | Bates | G06F 11/3664 717/125 |

OTHER PUBLICATIONS

Olivier, J., et al., Debugging Distributed Shared Memory Applications, Lecture Notes in Computer Science, vol. 4330, 2006, pp. 833-844, [retrieved on Sep. 6, 2016], Retrieved from the Internet: <URL:http://link.springer.com/chapter/10.1007/11946441_75>.*

U.S. Appl. No. 14/567,608, entitled "Enhancing Weak Consistency", filed Dec. 11, 2014.

IBM "List of IBM Patents or Patent Applications Treated as Related".

SPI DST, Suwa et al., ip.com, "An approach to verifying completeness and consistency in a rule-based expert system," Aug. 31, 1982, IPCOM000150713D, 17 pages.

SPI DST, Davis et al., ip.com: "An Interactive Analysis System for Excution-Time Errors", Jan. 31, 1975, IPCOM000151320D, 115 pages.

Lei et al., "UML Activity Diagram Based Testing of Java Concurrent Programs for Data Race and Inconsistency," 2008 International Conference on Software Testing, Verification, and Validation/IEEE, 10 pages.

* cited by examiner

ENHANCING WEAK CONSISTENCY

BACKGROUND

Aspects herein relate to computer software, and more specifically, to computer software to expose weak consistency errors in parallel computing applications.

A common problem in programming parallel computing applications is weak consistency, where portions (such as a thread or process) of the application access stale variable values. In order to make parallel systems run faster, most computer hardware does not replicate every store to memory across all threads in the parallel system in an atomic fashion. Approaches to keep the systems strongly consistent have a negative impact on system performance, which is why weakly consistent architectures have been adopted by most newer systems. Because of this, the programmer must be careful when accessing values that are set in different threads because the correct values may not appear in another thread at the time (or in the order) they were set.

There are many instances in parallel programming where accessing stale data is acceptable, and execution may continue as planned. However, there are times where accessing stale values can cause fatal results. These instances are difficult to detect because a certain timing window must be hit to encounter such errors.

SUMMARY

Aspects disclosed herein provide systems, methods, and computer program products to discover weak consistency errors in parallel applications, by executing, by a debugger, a first thread of the application, by, upon determining that a first instruction in the first thread specifies to store a first value at a first memory address, setting a current value stored in the first memory address as an old value for the first memory address in a container for the first thread, executing the first instruction to store the first value at the first memory address, and setting the first value as a new value for the first memory address in the container for the first thread. The debugger then executes a second thread of the application, by restoring the old value in the container for the first thread to the first memory address and restoring a new value for each memory address specified in a container for the second thread to the respective memory address.

DETAILED DESCRIPTION

Figure 1:
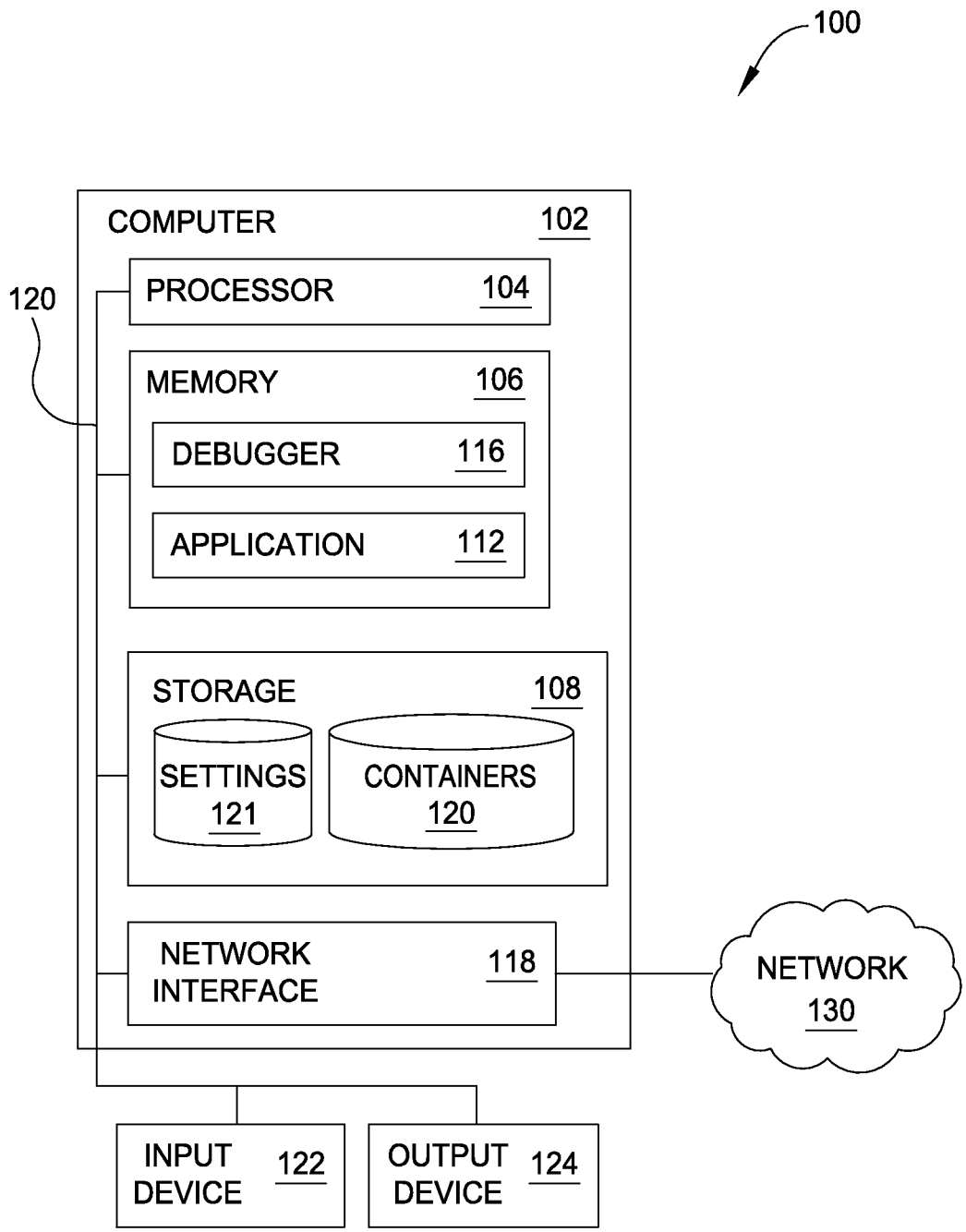
FIG. 1 is a block diagram illustrating a system to enhance weak consistency, according to one aspect.

Aspects disclosed herein provide techniques to discover stale data in a parallel computing application that could have unwanted consequences. Stale data may generally refer to a variable whose memory location has not been updated to reflect a change in a value of the variable. Specifically, aspects disclosed herein provide a run mode in an application debugger that is designed to expose weak consistency errors that may otherwise not occur, or not occur very frequently. In one aspect, the run mode (or "weak consistency mode") runs each of the threads of the parallel application through the debugger one at a time in order to discover the weak consistency errors that could be fatal (and otherwise occur too infrequently to be reasonably debugged). During this run, the debugger manages the variable values so the values remain stale. The debugger makes sure that values are stale until the debugger encounters a "sync" operation, at which point the debugger makes the values consistent across all threads. This emulates a worst possible behavior of a weakly consistent system, where all values are stale, and allows a programmer to more readily discover weak consistency errors. In addition, less extreme weakly consistent errors may be recreated in order to find errors.

Generally, in "weak consistency mode," each thread is provided with a container that stores "new" and "old" values for application variables. In some aspects, more than one old value may be stored for each variable. In execution, the debugger selects a thread and begins instruction stepping in that thread. If the current instruction is a "store" instruction (i.e., stores a value to memory), the debugger will, prior to stepping over the instruction, determine the value of the variable to be stored. If a record for the variable does not exist in the current thread's container, the debugger will create a record for the variable in the container. The debugger may then set the "old" value for the variable in the container as the current value at the memory address for the variable (that is, the value existing at the memory address for the variable prior to executing the store instruction). The debugger may then step over the store instruction, which may store an updated value to the memory address of the variable. The debugger may then set the updated value in the memory address as the "new" value for the variable in the thread's container. For example, an integer x may have a value of 2 prior to the store instruction. In such a case, the debugger may set the "old" value for the variable x in the thread's container as 2. After stepping over the store instruction, the value of x in memory may now be 4. As such, the debugger may store the value of 4 as the "new" value for the variable x in the thread's container. In at least one aspect, entries in the containers of each thread may be indexed based on the memory addresses allocated to the variables.

In the event the next instruction is a "sync" instruction, the container for the thread is cleared, because at this point, it is not possible for values to be stale, and it is no longer necessary to restore the prior values. The debugger may continue stepping over instructions in the current thread, attempting to discover weak consistency errors, until the debugger determines to schedule a new thread for debugging. The debugger may switch threads for any reason, including stepping over a predefined number of instructions in the current thread, expiration of a predefined time threshold for processing a given thread, or encountering a blocking type of instruction (such as a semaphore) that may time out or otherwise hang execution of the thread.

Before the debugger steps instructions in the new thread, the debugger may restore all of the old values (since the last sync instruction) from the containers of all other threads to storage. Doing so may make the system state as if the previous store instructions in the other threads did not occur. The debugger then restores each new value in the new thread's container. The debugger then repeats the instruction stepping algorithm described above, keeping track of the addresses the thread stores to, and maintaining the old and new values associated with those addresses in the thread.

Each thread has a data structure (or container) that saves the addresses stored to, and its corresponding old and new values. A properly written program will run correctly if the values are made stale during the weak consistency mode. Having the weak consistency mode makes it easier for programmers to discover weak consistency errors in a debug session.

In addition, the debugger may pre-scan the program code and set breakpoints on predefined instructions, such as store instructions and/or sync instructions, to facilitate the weak consistency mode. The breakpoints may also be set at instructions that may stall execution of the thread. In some aspects, the debugger may execute in weak consistency mode for only some given percentage of execution time, or for some predefined amount of time (such as one second in weak consistency mode). Further still, in some aspects, the debugger may not restore all of the old variable values in the containers, but only a subset of variable values, such that not all of the values are stale, but only a certain amount of variable values are randomly stale.

FIG. 1 is a block diagram illustrating a system 100 to enhance weak consistency, according to one aspect. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. In at least one aspect, the processor 104 has at least a single core capable of processing at least two threads. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, SAN storage, NAS storage, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 stores an application 112 and a debugger 116. The application 112 may be any application executed on the computing system 100. The debugger 116 is an application generally configured to test and/or debug other applications, such as the application 112. The debugger 116 is further configured to provide the "weak consistency mode" described above, where the debugger 116 steps through instructions of each thread of the application 112. While stepping through the instructions of each thread, the debugger 116 maintains, in the containers 120, the old and new values of variables stored by the thread of the application 112. When the debugger 116 selects a new thread of the application 112 for processing in the weak consistency mode, the debugger 112 may restore the old values of variables in the containers 120 to the corresponding memory addresses of the variables in order to provide the new thread with stale values. Doing so may expose weak consistency errors that may have otherwise gone undetected.

As shown, the storage 108 includes set of containers 120 and a settings 121. The containers 120 are data structures that store current and previous values stored to memory addresses by the application 112. The settings 121 may be settings for the debugger 116, which specify how the debugger 116 should operate. For example, the settings 121 may specify when and how often the debugger 116 should operate in weak consistency mode (or switch to/from weak consistency mode). The settings 121 may further specify what variables should have their old values restored, such as all variables or only a random subset. As another example, the settings 121 may include predefined counts of instructions that the debugger 116 should step over while iteratively processing each thread. For example, the settings 121 may specify that the debugger 116 should step over a total count of 10 instructions per thread. As still another example, the settings 121 may specify an amount of time the debugger 116 should execute a thread, such as 100 milliseconds. Once these thresholds are met, the debugger 116 may then switch to another thread for processing. In at least one aspect, the settings 121 are stored in the code of the debugger 116.

Figure 2:
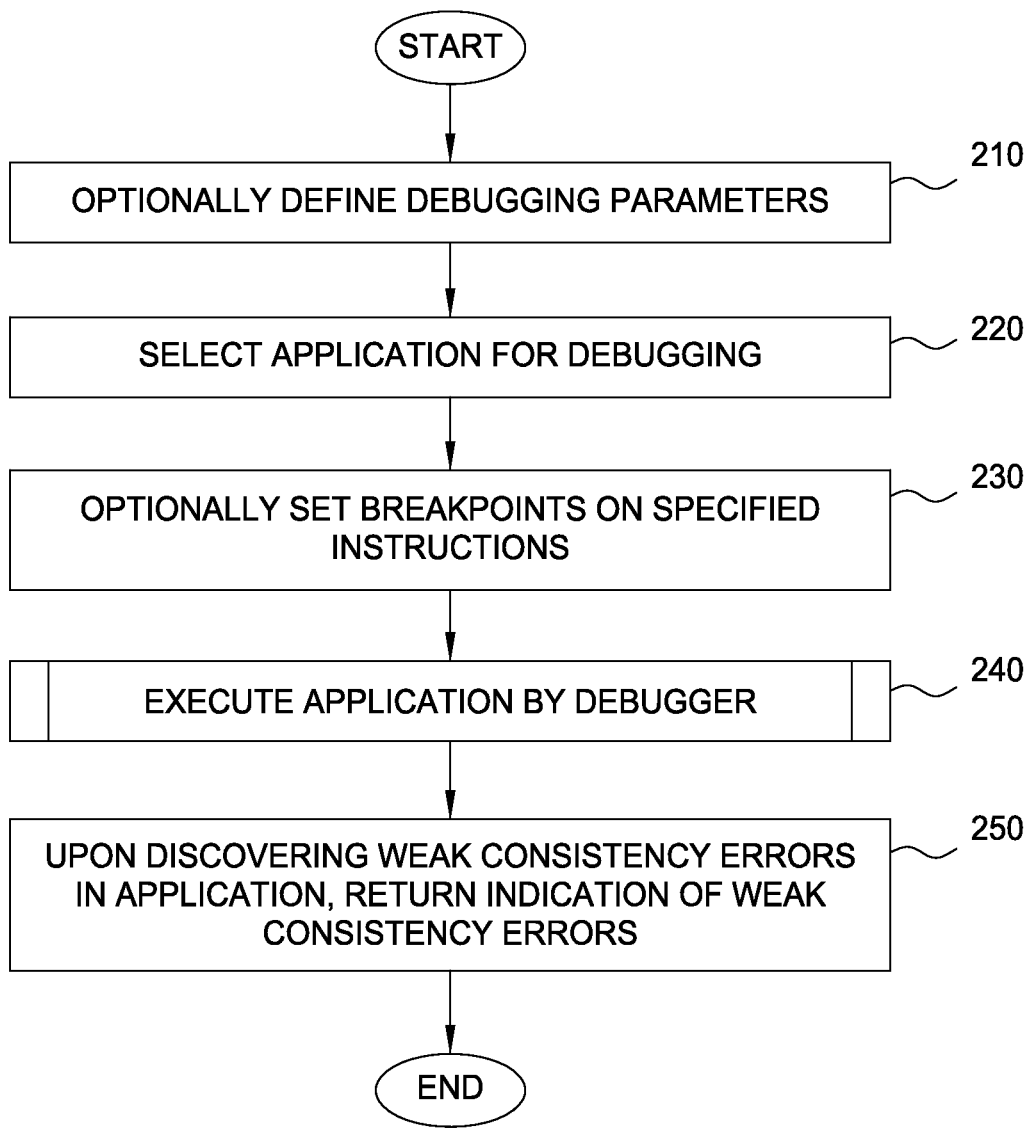
FIG. 2 is a flow chart illustrating a method to enhance weak consistency, according to one aspect.

FIG. 2 is a flow chart illustrating a method 200 to enhance weak consistency, according to one aspect. Generally, the steps of the method 200 provide a debugger that includes a weak consistency mode configured to expose weak consistency errors in program code of parallel applications 112. At step 210, a user may optionally define debugging parameters for the debugger 116. For example, the user may specify that the debugger 116 should run in weak consistency mode for some predefined amount of time, for some predefined percentage of execution, and the like. Generally, the user may define any schedule for the debugger 116 to run in weak consistency mode, which may include alternating to and from weak consistency mode during execution of the debugger 116. In addition, the user may specify a subset of variables that may be manipulated by the debugger 116 in weak consistency mode, or a maximum number of variables that may randomly be selected for manipulation by the debugger 116 in weak consistency mode. The user may also specify whether the debugger 116 should scan the code of the selected application 112 to insert breakpoints in the code. For example, the debugger 116 may insert breakpoints at store and sync instructions in the code of the application 112.

At step 220, the user may select a parallel computing application 112 for debugging by the debugger 116. At step 230, the debugger 116 may optionally set breakpoints at specified instructions, such as the store and sync instructions in the code of the application 112. At step 240, described in greater detail with reference to FIG. 3, the debugger 116 may execute the selected application 112 in order to expose weak consistency errors in the application 112. At step 250, the debugger 116 may, upon discovering weak consistency errors in the application 112, return an indication of the detected weak consistency errors. Generally, the debugger 116 may use any technique to expose weak consistency errors. For example, if a weak consistency error may cause the application 112 to crash or otherwise fail, the debugger 116 may return an indication of the error to the user.

Figure 3:
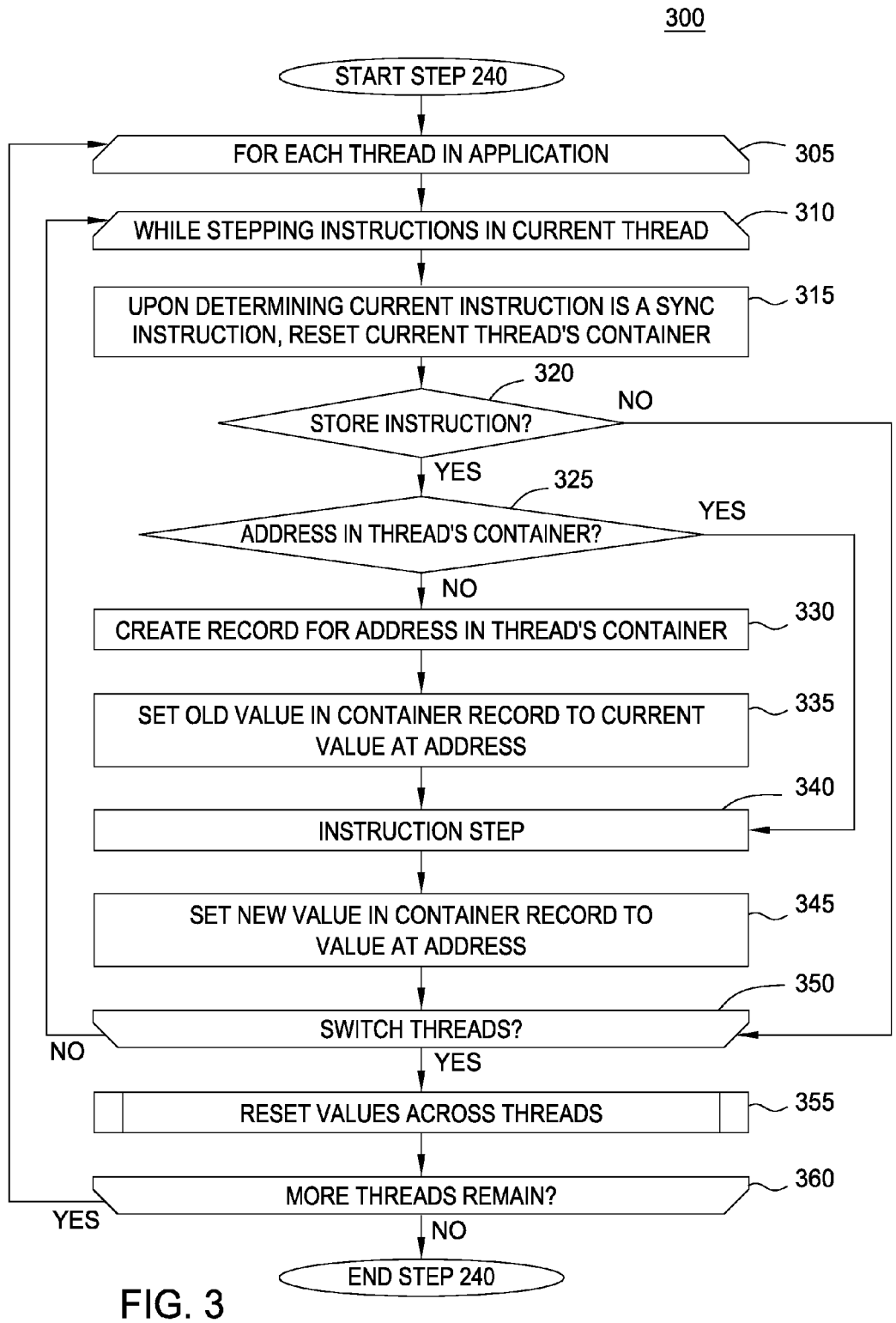
FIG. 3 is a flow chart illustrating a method to execute an application using a debugger, according to one aspect.

FIG. 3 is a flow chart illustrating a method 300 corresponding to step 240 to execute an application using a debugger, according to one aspect. Generally, the steps of the method 300 allow the debugger 116 to execute in weak consistency mode. In weak consistency mode, the debugger 116 iteratively processes threads of a parallel computing application 112 while ensuring stale values are provided to each thread in order to expose weak consistency errors in the application 112.

At step 305, the debugger 116 begins executing a loop including steps 310-360 for each thread in the application 112. Generally, at step 305, the debugger 116 selects a thread of the application 112 to debug in weak consistency mode. The debugger 116 may use any criteria in selecting a given thread for processing in weak consistency mode. For example, a round-robin approach may be used to select threads, or the threads may be selected at random. In another aspect, a user may specify the order in which the debugger 116 selects threads. At step 310, the debugger 116 executes a loop including steps 315-350 while stepping instructions in the current thread. At step 315, the debugger 116 resets the container 120 for the current thread upon determining that the current instruction is a sync instruction. The container 120 for the current thread is reset at a sync instruction because the sync instruction causes all variables to be synchronized across all threads of the parallel computing application 112, and weak consistency errors cannot occur at this point. At step 320, the debugger 116 determines whether the current instruction is a store instruction specifying to store a value for a variable to memory. If the current instruction is not a store instruction, the debugger 116 steps over the current instruction and proceeds to step 350 in order to determine whether to continue stepping over instructions in the current thread.

If the current instruction is a store instruction, the debugger 116 proceeds to step 325. At step 325, the debugger 116 determines whether an entry of the memory address for the variable that is the subject of the store instruction is present in the container 120 of the current thread. If the debugger 116 determines that a record for the address is in the current thread's container 120, the debugger 116 proceeds to step 340. If a record for the memory address is not present in the thread's container 120, the debugger 116 proceeds to step 330, where the debugger 116 creates a record for the memory address in the container 120 for the current thread. At step 335, the debugger 116 may set the current value at the memory address for the variable subject to the store instruction as a most recent "old" value for the memory address in the container 120. Doing so allows the debugger 116 to restore this old value when providing other threads with stale values in the weak consistency mode.

At step 350, the debugger 116 may determine whether to switch to a new thread for debugging. Generally, the debugger 116 may switch to a new thread for any reason. For example, and without limitation, the debugger 116 may switch to a new thread because a predefined count of instructions in the current thread have been stepped over, a predefined amount of time for debugging the current thread has elapsed, a breakpoint set at the current instruction at step 230 has been encountered, or the current instruction is otherwise a blocking instruction that may halt processing of the current thread. If the debugger 116 determines to continue processing the current thread, the debugger 116 may return to step 310. Otherwise, the debugger 116 may proceed to step 355. For example, the settings 121 may specify a threshold of 15 instructions per thread. If the debugger 116 has stepped over the $10^{th}$ instruction in the current thread, the debugger 116 will not switch threads and return to step 310. If the debugger 116 stepped over the $15^{th}$ instruction, however, the debugger 116 will proceed to step 355. Similarly, if the settings 121 specify a threshold of 50 milliseconds for executing the current thread, the debugger 116 will switch threads if a timer indicates that the current thread has been executing for more than 50 seconds. As still another example, if the debugger 116 determines that the current thread will hang or has otherwise encountered a blocking instruction, the debugger 116 will switch to another thread.

At step 355, the debugger 116 has determined to switch to a new thread for processing in weak consistency mode. Therefore, to provide the new thread with stale values, the debugger 116 may reset the variable values across the threads at step 350, described in greater detail with reference to FIG. 4. Generally, the debugger 116 may reset all variables or a subset of variables across all threads (or a subset of threads) of the application 112.

Figure 4:
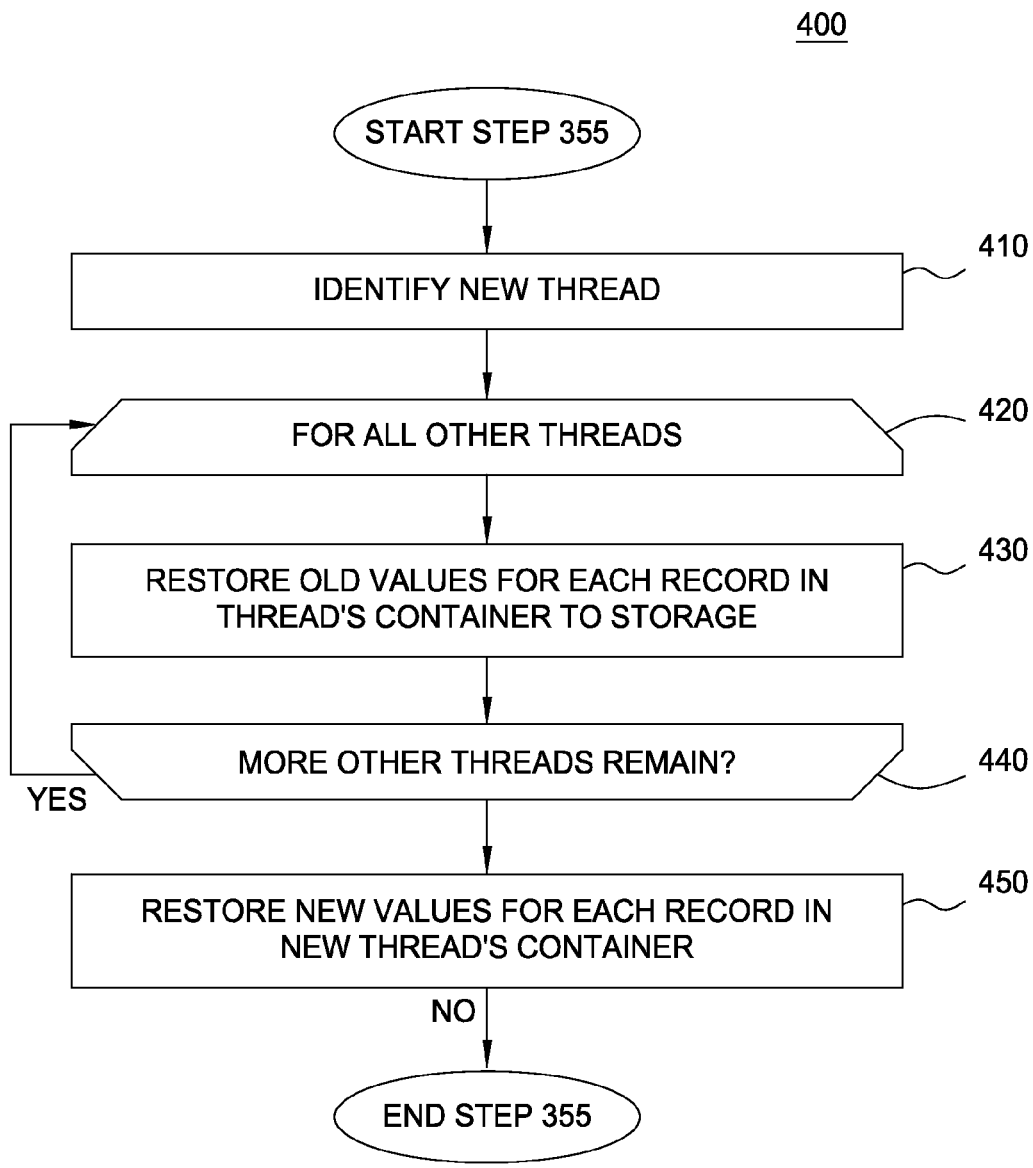
FIG. 4 is a flow chart illustrating a method to reset values across threads, according to one aspect.

FIG. 4 is a flow chart illustrating a method 400 corresponding to step 355 to reset values across threads, according to one aspect. Generally, in executing the steps of the method 400, the debugger 116 may ensure that stale data is provided to the new thread being switched to for instruction stepping. Doing so may allow the debugger 116 to expose weak consistency errors in the application code of the new thread. At step 410, the debugger 116 may identify the new thread of the application 112 being switched to. The debugger 116 may generally select any thread that has yet to be processed in weak consistency mode during the current debugging session. At step 420, the debugger 116 may execute a loop including steps 430-440 for all other threads in the application 112 (other than the new thread identified at step 310). At step 430, the debugger 116 may restore the old values for each record in the current thread's container 120 to the respective memory address indicated in the container 120. For example, variable Z may be stored at memory address A. The debugger 116 may then reference the old value for variable Z in the container for the current thread (which may be indexed by memory address A). The old value for variable Z may be 33, while the new value is 10. The debugger 116 may then set the value of variable Z at memory address A to be 10. Doing so provides a stale value of variable Z to the new thread, and may expose a weak consistency error in the new thread. As previously indicated, the debugger 116 may restore old values for all variables in the container 120 of the current thread, or only a subset of the variables in the container 120. At step 440, the debugger 116 may determine whether more "other" threads remain, namely threads other than the new thread identified at step 410. If more threads remain, the debugger 116 may return to step 420 to restore the old values of variables in these threads as well. If no more threads remain, the debugger 116 may proceed to step 450. At step 450, the debugger 116 may restore the new values for each record in the new thread's container 120. For example, if variable Z, previously discussed above, has a value of 56 in the container 120 for the new thread, the debugger 116 may restore the value of 56 to the memory address A. The debugger 116 may repeat this step as necessary for all variables in the container 120 for the new thread.

Advantageously, aspects disclosed herein provide a weak consistency mode in a debugger that provides stale values to threads to discover weak consistency errors in a parallel programming application. By maintaining a history of old values for each variable in a thread (along with current or "new" values of the variables), aspects disclosed herein may easily provide stale data to threads during the debugging process. Doing so may expose weak consistency errors when debugging the program code that may have otherwise gone undetected.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

The present aspects may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present disclosure, other and further aspects may be devised without departing from the basic scope thereof, and the scope thereof is determined by the claims that follow.

What is claimed is:

1. A computer program product, comprising:
a non-transitory computer-readable storage medium having computer-readable program code embodied therewith, the computer-readable program code executable by a processor to perform an operation to discover errors in a parallel application comprising a plurality of threads, the operation comprising:
scanning, by a debugger, a program code of the parallel application;
setting a respective breakpoint in the program code of the parallel application at each: (i) sync instruction in the program code, and (ii) instruction determined to stall execution of the program code, wherein the debugger is configured to switch execution from a first thread of the plurality of threads of the parallel application to a second thread of the plurality of threads of the parallel application upon encountering one of the breakpoints in the program code;
executing, by the debugger, the first thread, comprising:
upon determining that a first instruction in the first thread specifies to store a first value at a first memory address:
setting a current value stored in the first memory address as an old value for the first memory address in a container for the first thread;
executing the first instruction to store the first value at the first memory address; and
setting the first value as a new value for the first memory address in the container for the first thread, wherein the container for the first thread specifies a new value and an old value for each of a plurality of memory addresses including the first memory address; and
executing, by the debugger, the second thread, comprising:
restoring each old value for the plurality of memory addresses in the container for the first thread to the respective memory address specified in the container for the first thread; and
restoring a new value for each of a plurality of memory addresses specified in a container for the second thread to the respective memory address specified in the container for the second thread.

2. The computer program product of claim 1, wherein the old value for the first memory address is of a plurality of old values for the first memory address stored in the container for the first thread, the operation further comprising:
prior to setting the current value stored in the first memory address as the old value for the memory address in the container for the first thread:
upon determining that the container for the first thread does not include a record for the first memory address, creating a record for the first memory address in the container for the first thread,
wherein the record for the first memory address specifies each of the plurality of old values for the first memory address and the new value for the first memory address subsequent to setting the first value as the new value for the first memory address in the container for the first thread and prior to executing the second thread.

3. The computer program product of claim 1, the operation further comprising:
upon determining that the first instruction is a sync instruction, clearing the values in the container for the first thread.

4. The computer program product of claim 1, wherein the second thread is executed by the debugger upon further determining at least one of: (i) that the debugger has executed a predefined number of instructions of the first thread, and (ii) that an amount of time the debugger has executed the first thread exceeds a predefined time threshold.

5. The computer program product of claim 1, wherein executing the second thread further comprises:
restoring, for each thread of the parallel application, each old value in a respective container of each thread to a respective memory address associated with each old value prior to restoring the new value for each memory address in the container for the second thread.

6. The computer program product of claim 1, wherein executing the second thread further comprises:
upon determining that a second instruction in the second thread specifies to store a second value at a second memory address:
setting a current value stored in the second memory address as an old value for the second memory address in the container for the second thread;
executing the second instruction to store the second value at the second memory address; and
setting the second value as a new value for the second memory address in the container for the second thread.

7. The computer program product of claim 1, the operation further comprising:

upon determining that executing a second instruction in the second thread causes a weak consistency error, returning an indication of the weak consistency error.

8. A system, comprising:

one or more computer processors; and a memory containing a program, which when executed by the one or more computer processors, performs an operation to discover errors in a parallel application comprising a plurality of threads, the operation comprising:

scanning, by a debugger, a program code of the parallel application;

setting a respective breakpoint in the program code of the parallel application at each: (i) sync instruction in the program code, and (ii) instruction determined to stall execution of the program code, wherein the debugger is configured to switch execution from a first thread of the plurality of threads of the parallel application to a second thread of the plurality of threads of the parallel application upon encountering one of the breakpoints in the program code;

executing, by the debugger, the first thread, comprising:

upon determining that a first instruction in the first thread specifies to store a first value at a first memory address:

setting a current value stored in the first memory address as an old value for the first memory address in a container for the first thread;

executing the first instruction to store the first value at the first memory address; and setting the first value as a new value for the first memory address in the container for the first thread, wherein the container for the first thread specifies a new value and an old value for each of a plurality of memory addresses including the first memory address; and executing, by the debugger, the second thread, comprising:

restoring each old value for the plurality of memory addresses in the container for the first thread to the respective memory address specified in the container for the first thread; and restoring a new value for each of a plurality of memory addresses specified in a container for the second thread to the respective memory address specified in the container for the second thread.

9. The system of claim 8, wherein the old value for the first memory address is of a plurality of old values for the first memory address stored in the container for the first thread, the operation further comprising:

prior to setting the current value stored in the first memory address as the old value for the memory address in the container for the first thread:

upon determining that the container for the first thread does not include a record for the first memory address, creating a record for the first memory address in the container for the first thread, wherein the record for the first memory address specifies each of the plurality of old values for the first memory address and the new value for the first memory address subsequent to setting the first value as the new value for the first memory address in the container for the first thread and prior to executing the second thread.

10. The system of claim 8, the operation further comprising:

upon determining that the first instruction is a sync instruction, clearing the values in the container for the first thread.

11. The system of claim 8, wherein the second thread is executed by the debugger upon further determining at least one of: (i) that the debugger has executed a predefined number of instructions of the first thread, and (ii) that an amount of time the debugger has executed the first thread exceeds a predefined time threshold.

12. The system of claim 8, wherein executing the second thread further comprises:

restoring, for each thread of the parallel application, each old value in a respective container of each thread to a respective memory address associated with each old value prior to restoring the new value for each memory address in the container for the second thread.

13. The system of claim 8, wherein executing the second thread further comprises:

upon determining that a second instruction in the second thread specifies to store a second value at a second memory address:

setting a current value stored in the second memory address as an old value for the second memory address in the container for the second thread;

executing the second instruction to store the second value at the second memory address; and setting the second value as a new value for the second memory address in the container for the second thread.

* * * * *